Aug. 4, 1936.                H. G. LEE                2,049,843
                          SIGNAL DEVICE
                       Filed Oct. 4, 1935          2 Sheets-Sheet 1
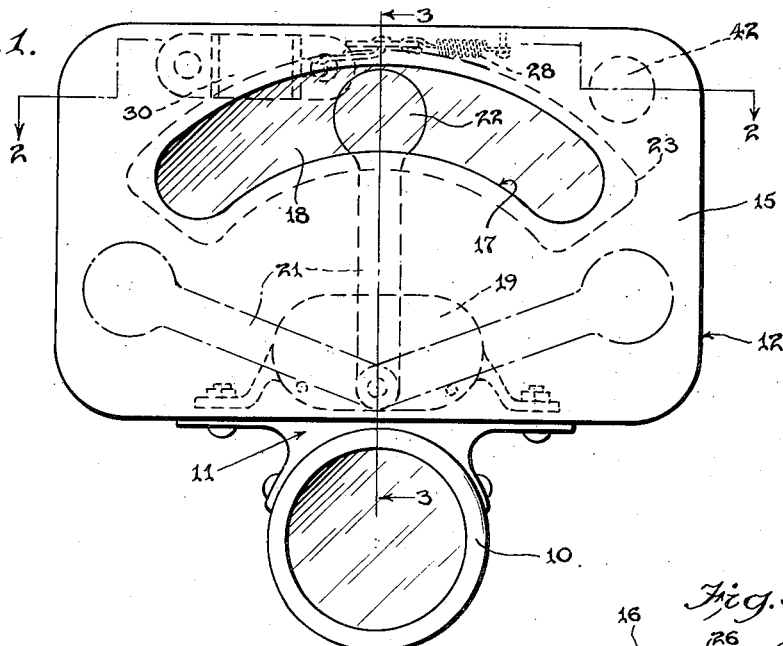
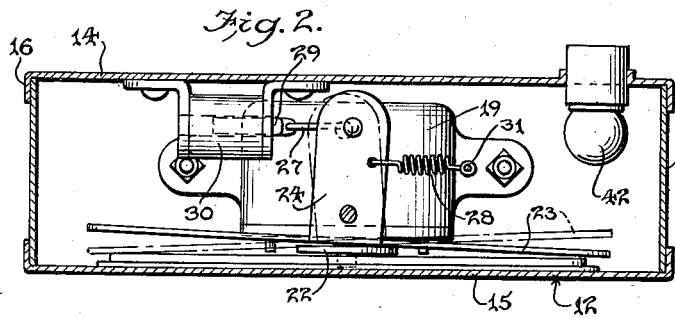
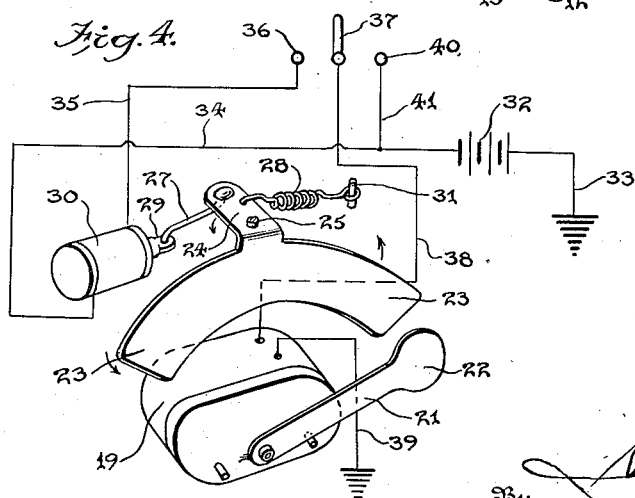
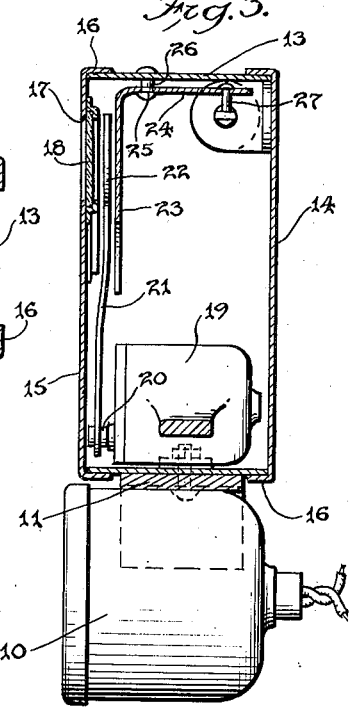
Inventor
Harry G. Lee,
By
Attorney Aug. 4, 1936.　　　　H. G. LEE　　　　2,049,843
SIGNAL DEVICE
Filed Oct. 4, 1935　　　　2 Sheets-Sheet 2
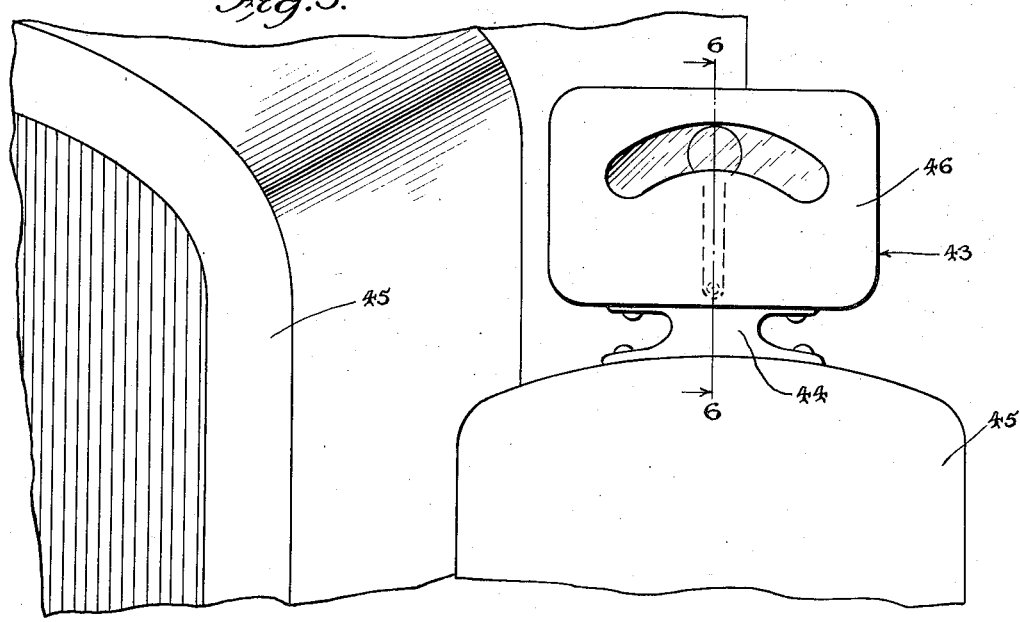
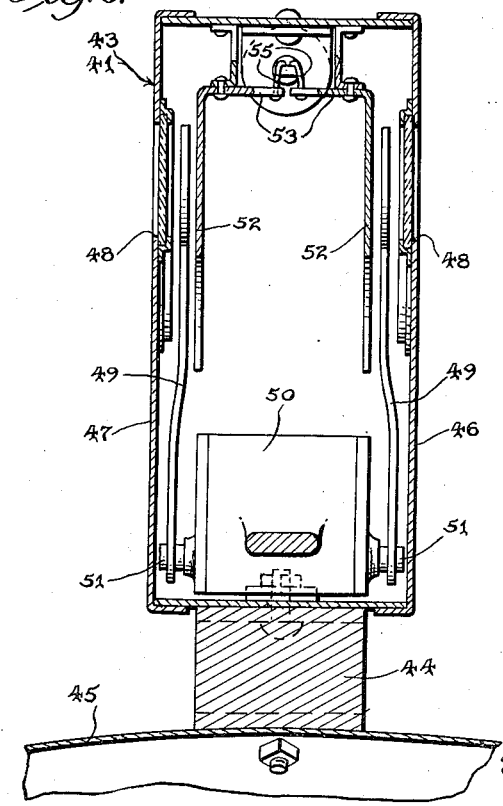
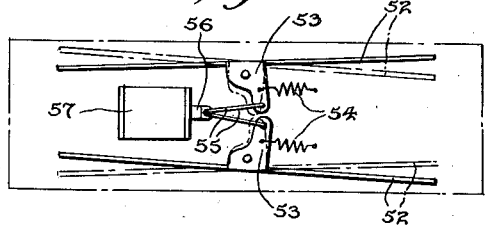
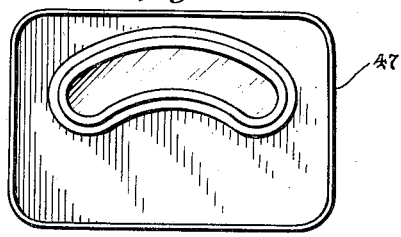
Inventor
Harry G. Lee,
Attorney Patented Aug. 4, 1936

2,049,843

UNITED STATES PATENT OFFICE 2,049,843

SIGNAL DEVICE

Harry George Lee, Unionville, Conn., assignor to Louis Shapiro, Unionville, Conn.

Application October 4, 1935, Serial No. 43,614

11 Claims. (Cl. 177—327)

The present invention relates generally to direction signals for automobiles and more particularly to a manually controlled arrangement having for its primary purpose greater attractiveness in use to more promptly and effectively arrest the attention of the operators of adjacent vehicles, than the ordinary lighted signals and those which, in their direction indicating positions, are static or inert.

Moreover, for the above reason or purpose, the invention proposes a signal of a type capable of enclosure in a suitable casing and of ready protection in a water or weatherproof manner, as well as of use either in single form at the rear of a vehicle to display a signal rearwardly only of that vehicle, or in multiple or double form upon the front fender or other prominent forward portion of a vehicle to display a signal both in front, and to the rear, of the vehicle.

In carrying out the invention and fulfilling the objects which for the most part bring the invention into being, it is proposed to use a signal member having a continuous back and forth movement during any signaling period, together with operator-controlled means for masking movement of said signal member in one direction, so that it will be exposed to view as a signal during only its movement in a selected or desired direction, corresponding to the proposed direction of turning movement of the vehicle. For practical purposes, the signal member having the above movement, which may be operated from a unidirectional source of motion, will be housed in a suitable casing having a laterally elongated sight opening through which the signal member may be viewed in its movement in one direction or the other.

With the above in mind it becomes then obvious that the signaling or indicating member may have either a back and forth rectilinear or straight line movement, or a swinging or oscillating movement, and that it may be actuated either by an electrical or other motor or means such as vacuum or air pressure. It is moreover apparent that the member itself may be of any suitable form or construction, since the main consideration, as far as attracting and holding the attention of those to whom the signal is displayed, is the fact of the actual movement of the signaling member during the signaling period.

With the above in mind, it will be readily understood that the more detailed disclosure to follow deals only with the best mode so far devised for carrying the invention into practical effect, as well as the structural features necessary thereto. The description refers to the accompanying drawings, which form a part of this specification, and in which, Figure 1 is a rear elevation illustrating the practical use of the invention as a rear signal in connection with the tail-lamp of the vehicle.

Figure 2 is a horizontal sectional view taken substantially on line 2—2 of Figure 1.

Figure 3 is a vertical transverse sectional view taken on line 3—3 of Figure 1.

Figure 4 is a skeleton view of the essential parts of the signal, showing in diagrammatic form the means through which control is effected.

Figure 5 is a front elevation showing practical application of the invention in its double form in connection with one front fender of a vehicle.

Figure 6 is a vertical transverse section taken on line 6—6 of Figure 5.

Figure 7 is a detail plan view of the two masking shields and their immediate connections.

Figure 8 is a face view looking at the inner face of one of the walls of the casing.

Referring now to these figures and more particularly to the single form of the invention as shown in Figures 1 to 4, inclusive, there is shown in Figures 1 and 3 the tail-lamp of a vehicle, generally indicated at 10, upon which, through the use of a suitable bracket or other means of a generally similar nature as indicated at 11, a rectangular or other shaped casing 12 may be mounted. As best shown in Figures 2 and 3, the casing 12 may include a frame plate 13 of the shape of the casing, to the front and rear edges of which front and rear walls 14 and 15 may be removably connected, as, for instance, by means of flanges 16 carried by these walls and telescoping the front and rear portions of frame plate 13.

In this form of the invention, the front wall 14 may be continuous and unbroken throughout, but the rear wall 15 is provided with a laterally elongated slot-like sight opening 17, shown in the present instance as covered by a transparent glass or other transparent cover 18, which may be mounted in brackets upon the inner face of the rear wall.

Suitably mounted in the lower central portion of the casing is a suitable motor 19 for imparting oscillating movement to a shaft 20. While the motor 19 may be of any suitable character, for instance, vacuum or air pressure operated, it is shown in the present instance as of an electrical nature.

Secured at one end upon the shaft 20 in any suitable manner, there is shown a signal arm 21, whose arc of movement, during oscillation thereof, is such that the enlarged disk-shaped head 22 at the free end thereof moves in a path exposing the same in movement throughout the full length of the sight opening 17, although it will be noted from the dotted line positions of Figure 1, that the full stroke of this signal arm carries the same at the ends of its movements substantially beyond the ends of the sight opening 17.

Approximately in vertical line with the signal arm 21 or with at least that portion of the signal arm carrying the disk-shaped head 22, there is an opaque shield 23, whose shape may, as is indicated plainly in Figures 1 and 4, take the general shape of the sight opening 17, although it will be noted that the shield is slightly larger both laterally and longitudinally thereof than the sight opening, so that mounted behind the sight opening as it is, its upper and lower as well as its end edges are concealed from view. This shield 23, disposed in a vertical plane, has at its central portion an angular rearwardly bent arm 24 provided with an opening 25 at a point adjacent to the shield, to receive a stud 26 depending from the top of the casing and upon which the arm pivots to bodily swing the shield and in this way shift the lateral end portions toward and away from the inner surface of the rear wall of the casing and to relatively opposite sides of the plane of movement of the signal arm 21 or at least the disk-shaped outer or free end of this arm.

The purpose in thus canting or bodily shifting the shield 22 is to guide the freely flexible signal arm as it moves across the sight opening, so that during its movement in one direction, it passes in front of the shield and, in its movement in the other direction, it passes in back of the shield. The result of this is that the disk-shaped head of the signal arm is exposed to view in its movement in one direction and concealed from view in its movement in the opposite direction, and it is obvious it may be exposed to view in either direction of movement by shifting the shield 23 in the manner above described.

In order that the shifting of the shield may be controlled, its arm 24 is at a point inwardly beyond pivot 26, connected to one end of a link 27 extending laterally in one direction therefrom, and to the free end of a spring 28 extending laterally therefrom in the opposite direction. The link 27 may be connected to the core member 29 of an electromagnet 30, and the other end of the spring 28 may be anchored upon a pin or other suitable anchoring member 31 connected to the top of the casing.

As shown in the diagram of Figure 4, a battery or other suitable source of current indicated at 32 may have a ground lead 33 from one side and may be connected at its opposite side through a wire 34 with the electromagnet 30, the latter being connected through a wire 35 with one of the contacts 36 of a double-throw switch, the movable member 37 of which is connected by a wire 38 with the motor 19.

The motor may have a ground lead 39, and the other stationary contact 40 of the switch may be connected by a wire 41 with the battery wire 34.

Thus the motor 19 will be rendered active upon movement of the movable member of the switch into engagement with either of the stationary contacts 36 and 40 and, when contact 36 is engaged, the electromagnet 30 will be energized to so move its core member 29 as to shift the shield 23, bringing one end thereof into close proximity with the rear wall of the casing and moving the other end thereof away from the casing. This will result in exposing the signal arm during its movements in a counterclockwise direction viewed from the rear of the signal casing, since during these movements the disk or target-shaped free end of the signal arm will be guided along the outer face of the shield and between the latter and the sight opening 17, while its clockwise movements will be guided by the shield along its inner face and thus concealed from view by the shield. This movement and exposure of the indicating member, forming the readily viewable and attention-attracting signal that the operator is about to make a left-hand turn, is maintained until the movable member 37 of the switch is withdrawn to an intermediate inactive position from the contact 36, whereupon the circuit is broken through the motor 19 and through the electromagnet 30, and whereupon the solenoid core 29 is released, permitting the spring 28 to shift the shield 23 to the position shown in full lines in Figure 2, wherein its inclination is reversed with respect to the inner surface of the rear wall of the casing. Thus when, with the idea of signaling a right-hand turn, the operator shifts the movable member of the switch into engagement with the contact 40, the motor 19 will again become active, since the circuit thereof will be completed through the battery 32, but the electromagnet will remain inactive since it is not included in this circuit, and thus the shield will continue in its spring-shifted and spring-held position last above described so that the target end of the signal member 21 will be guided by the shield in the clockwise movements thereof, along the outer face of the shield between the latter and the sight opening 17, and thus exposed, while the counterclockwise movements of the signal arm will be guided by the shield along its inner face and concealed by the shield from view.

It is not only plain from the foregoing that the substantial effect of the signal results from the fact that it follows the exposed direction of movement of the signal arm, but it is equally apparent that its effectiveness arises from the fact that this movement continues throughout the signalling period.

While it is contemplated that the glass 18 covering the sight opening 17 may, and usually will be, clear white transparent glass through which the suitably colored target or disk 22 of the signal arm may plainly show, it is possible the signal may be enhanced by contrasting colors of the target or disk and the glass of the sight opening, and while these features, varied in accordance with desires or possibly with traffic ordinances and the like, suffice for daytime signals, for night signaling purposes, the casing may have therein a suitably disposed source of illumination, as, for instance, a bulb 42 which will flood the interior of the casing with light simultaneously with each actuation of the motor 19, and thus flood with light the space between the shield 23 and the sight opening 17, so that the movements of the signal arm may be readily seen. On the other hand, the signal arm itself may have a free or target end 22 in the form of a bulb or housing or containing a bulb, so that its movements will be readily discernible against the darkened background presented by the interior of the casing.

The above and various other features including the shape and construction of the casing, as well as the signal member itself and the manner of bringing about its back and forth movements, may be varied within relatively wide limits, and it is obvious that however varied, the signal may be made of a size to be readily brought to sight and still confined within a casing of small area, and actuated in its movements by a force which need not of itself be of a reversible nature.

In Figures 5 to 8, inclusive, there is shown a generally similar arrangement of casing 43, which may in this instance be mounted by any suitable bracket 44 upon one of the front fenders or other suitable forward portion of a vehicle 45, both the front and rear walls 46 and 47 of the casing having glass-covered sight openings 48 and there being two signal arms 49, each of which may be a duplicate of the arm 21 before described.

In this instance the motor 50 will have its shaft provided with oppositely projecting ends 51 and there will be two shields 52 movable to alternately mask and expose the two signal arms. For the purpose of shifting the shields 52, the inwardly angular arms 53 thereof as shown in Figure 7 may be controlled as to their movement in one direction by springs 54, and these arms may be similarly connected by links 55 with the core member 56 of a single electromagnet 57, it being understood that the electrical connections may be the same as those described in connection with Figure 4, so that the single electromagnet will actuate both shields in their shifting movements in one direction.

In this the double form, the invention involves what may be simply a duplication of the single form of Figures 1 to 4, inclusive, so that in the use of the signal in connection with one of the front fenders, it will show to the front of the machine as well as to the back.

What is claimed is:

1. In a direction signal, a casing having front and rear walls each provided with a laterally elongated sight opening, signal members movable within the casing along the said sight openings and yieldable at right angles to the line of movement, remotely controlled means for simultaneously moving both of said signal members in alternately opposite directions along the respective sight openings during each signaling period, shields within the casing opposite the sight openings, each shield being disposed within and along the path of movement of one of the signal members, means selectively included in the remotely controlled actuated means of the signal members for simultaneously moving the shields to inclined positions masking movements of the signal members in one direction, and means operable upon release of the last-mentioned shield-actuating means to shift the shields for simultaneously reversing the same whereby to mask movements of the two signal members during their movements in the relatively opposite directions.

2. In a direction signal, a casing having a laterally elongated sight opening, a signal member movable along the sight opening and yieldable at right angles to its line of movement, means including an electric motor for continuously moving said member in alternately opposite directions during each signaling period, a source of current, a double-throw switch having each pole thereof in circuit with the motor and the source of current, an electromagnet in circuit with one pole of the switch, a shield opposite the sight opening and in vertical line with the path of movement of the signal member, connections between said shield and the electromagnet for inclining the former upon energization of the latter to mask movements of the signal member in one direction, and spring means operable upon deenergization of the electromagnet to reverse the inclination of the shield and mask movements of the signal member in the relatively opposite direction.

3. In a direction signal, a casing having an elongated sight opening, a movable signal member yieldable at right angles to its line of movement, means for continuously moving the signal member in relatively opposite directions along the sight opening during each signal operation, a shield disposed opposite the sight opening for its full length and arranged in the path of movement of the signal member, and means for selectively inclining the shield in the direction of its length to interpose the same bodily between the signal member and the sight opening during movements of the signal member in one direction whereby to mask the signal member and at the same time expose the same during its movements in the opposite direction.

4. In a direction signal, a casing having a curved laterally elongated sight opening, a movable signal member yieldable at right angles to its line of movement, means to continuously oscillate the signal member during each signal period whereby to move the same reversely along the sight opening, and a reversible selectively positionable shield opposite the sight opening for its full length and inclined in each position thereof in the path of movement of the signal member for masking movements of the signal member in one direction while exposing the signal member during its movements in the opposite direction for signal purposes and means for reversing said shield.

5. In a direction signal, a signal member, means for continuously moving the signal member in reverse directions during each signal period, and masking means in the path of movement of the signal member selectively positionable to cause movements of the signal member in one direction during each signal period along one side of the masking means and to cause movements of the member in the opposite direction along the other side of the masking means for signal purposes.

6. In a direction signal, a signal member, means for moving said member continuously in 65 reverse directions during the signal period, and means effective to mask movements of the signal member in one direction while exposing movements of the member in the opposite direction for signal purposes.

7. In a direction signal, a signal member, means to continuously move said signal member in alternately opposite directions throughout a signal period, inclined reversible means in the path of movement of the signal member to mask movements of the signal member in a selected direction and expose movements of said member in the opposite direction during a signal period and means for reversing the inclination of said masking means.

8. A direction signal for vehicles including a signal member, means for imparting continuous movement to said member in alternately opposite directions during a signaling period, and reversible remotely controlled means for masking the signal member during its movements in one direction and exposing the signal during its movements in the opposite direction, throughout each signaling period.

9. In a direction signal, a signal member having a yielding support, means for continuously moving said member in alternately opposite directions during a signaling period, and a shield forming a guide for the said signal member in its movements, said shield being interposed in the path of movement of the signal member and inclined in the direction of the length thereof to cause movement of the signal member in one direction along one face of the shield and movement of the said member in the opposite direction along the other face of the shield.

10. In a direction signal, a casing having a sight opening, a signal member having a yielding support, means for continuously moving the signal member in alternately opposite directions along the sight opening during each signaling period, and a shield opposite to and along the sight opening and inclined in the direction of its length in the path of movement of the signal member, said shield acting as a guide to cause movement of the signal member between the shield and the sight opening during movements of the member in one direction and to cause movement of the signal member along the opposite face of the shield during movements of the member in the opposite direction, said shield being movable to reverse its inclination and thus reverse the exposed and shielded movements of the signal member.

11. In a direction signal, signal means, a device for moving said signal means reversely along prescribed paths continuously during the signal period, masking means for the signal means, and operator controlled connections for shifting one of said means whereby the masking means is effective during movement of the signal means in either direction while exposing the signal means during movements in the opposite direction.

HARRY GEORGE LEE.